July 6, 1965   J. L. FORREST ETAL   3,193,410
METHOD AND APPARATUS FOR REMOVING A STRIP
OF COATING FROM A PRE-COATED WEB
Filed Feb. 7, 1962   4 Sheets-Sheet 1

INVENTORS
JOHN L. FORREST
ARTHUR L. TRIBOU
BY
ATTORNEYS

July 6, 1965

J. L. FORREST ETAL 3,193,410

METHOD AND APPARATUS FOR REMOVING A STRIP
OF COATING FROM A PRE-COATED WEB

Filed Feb. 7, 1962

INVENTORS
JOHN L. FORREST
ARTHUR L. TRIBOU
BY
ATTORNEYS

July 6, 1965

J. L. FORREST ETAL 3,193,410

METHOD AND APPARATUS FOR REMOVING A STRIP
OF COATING FROM A PRE-COATED WEB

Filed Feb. 7, 1962

INVENTORS
JOHN L. FORREST
ARTHUR L. TRIBOU
BY

ATTORNEYS

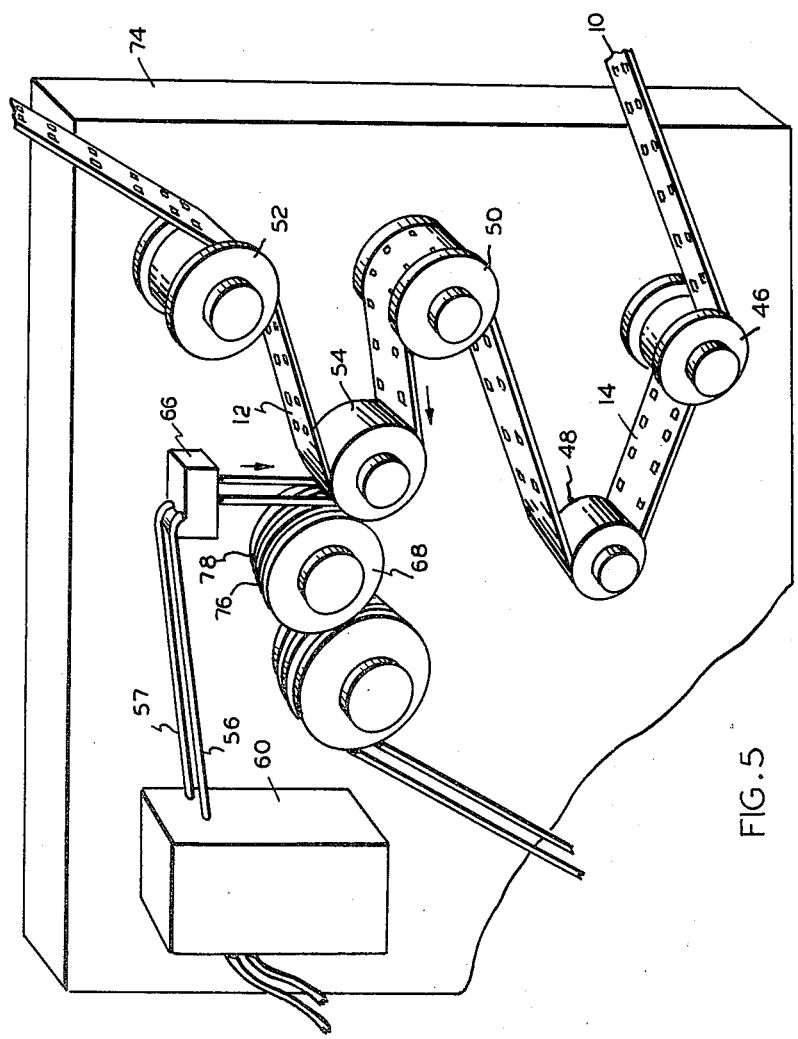

United States Patent Office 3,193,410
Patented July 6, 1965

3,193,410
METHOD AND APPARATUS FOR REMOVING A STRIP OF COATING FROM A PRE-COATED WEB
John L. Forrest, Windsor, and Arthur L. Tribou, Port Dickenson, N.Y., assignors to General Aniline & Film Corporation, New York, N.Y., a corporation of Delaware
Filed Feb. 7, 1962, Ser. No. 171,708
5 Claims. (Cl. 134—9)

This invention relates to improvements in a method and apparatus for removing a strip of coating from a precoated web, especially for removing a strip of back coating of a film web in order to prepare it for subsequent striping with a magnetizable coating.

In the art of motion pictures, technological advancements have made it feasible to provide sound recording by means of a magnetizable stripe placed on the motion picture film. In this way, amateur movie makers and others may record the sound at the same time the picture is being taken, or may "dub in" suitable sound later, thus utilizing the flexibility of magnetic recording to provide sound movies.

Commonly, motion picture films have a back coating known as an antihalation layer placed on the opposite side of the support from that of the sensiitzed layer. The back coating, generally referred to as CBC, is necessary to control the halation caused by reflection from the film web, and also to provide light protection to the light-sensitive layer in the roll, so that it can be loaded into the exposing equipment in light. This coating generally consists of carbon black, or a dye, incorporated in a suitable gelatin or resin binder or vehicle and is removed in the film processing solution. Since the back coating is removed in processing, it is therefore necessary to first remove the back coating precisely only from the area on which the magnetic stripe will be coated in order that the magnetic stripe can be coated directly on the web.

In order that the magnetic sound stripe on the film should not interfere with the pictures taken or projected, it must be placed at the edge of the film outside of conventional sprocket holes. The removal of a small area of CBC coating from the film in order to provide a clearance for the magnetic stripe in the place of the removed coating is difficult and has presented problems in the art. The dimensions of the film are rather small, thus increasing the difficulty of removing a narrow strip of coating without disturbing the CBC layer on the remainder of the film.

It is the primary object of this invention to provide a novel method and apparatus for precisely removing a predetermined strip of the back coating on the edge of motion picture film for subsequent coating with a stripe of magnetizable material.

A particular feature of this invention is that use is made of moving strands dampened with a solvent for the CBC coating and the back of the moving film web is contacted with the strands moving in the opposite direction. Means are also provided for guiding the strands and film relative to one another so that the strands contact the film at a precisely predetermined area to accurately remove a strip of the back coating.

Other objects and features will be apparent from the following description of the invention, pointed out in particularity in the appended claims and taken in connection with the accompanying drawings in which:

FIG. 5 is a perspective view of the modification shown in the FIG. 4 embodiment.

Figure 1:
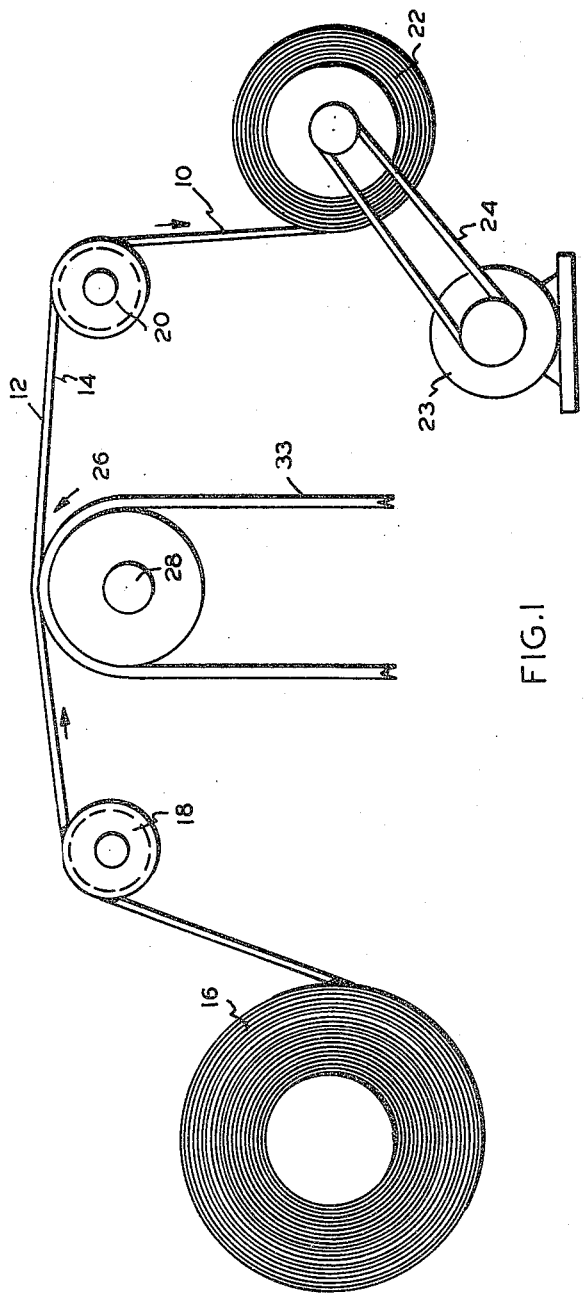
FIG. 1 is a schematic side elevational view of the apparatus showing the passage of the film and a solution absorbent strand for back coating removal in a preferred embodiment of this invention.

Referring now to the drawings, in FIG. 1, there is shown a film web 10 having front surface 12 carrying a light-sensitive emulsion coating and a back surface 14 with the CBC, or antihalo, coating thereon. The film is supplied from a roll 16 and passes over guide rollers 18 and 20 to be wound up on a wind-up roll 22 driven by a belt 24 from a suitable motor 23. The means for removing a longitudinal edge portion of the back coating 14 on the film 10 with which this invention is particularly concerned is illustrated at 26.

Figure 2:
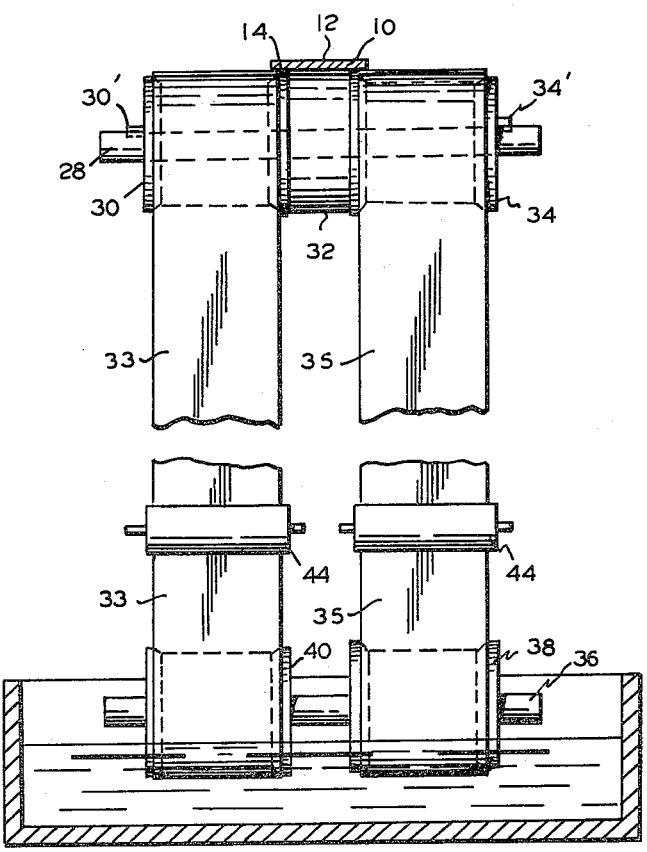
FIG. 2 is a schematic front elevation of the apparatus of FIG. 1 with the film shown in section, illustrating the strands in the form of endless belts and the means for dampening the belts.

Referring now to FIG. 2, between the guide rollers 18 and 20 (FIG. 1), there is provided a rotatable shaft 28 having rollers 30, 32 and 34 thereon. Rollers 30 and 34 are keyed to the shaft at 30' and 34', respectively, while roller 32 is free to rotate on the shaft 28 and is axially spaced so that it does not rub against rollers 30 and 34. The rollers 30 and 34 carry the endless belts 33 and 35, respectively, and are so dimensioned in diameter that the belts 33 and 35 will contact the bottom surface 14 of the film 10 slightly above the surface of roller 32. Thus, the belts will contact the edges of the back coating 14 on film 10 and the film will be prevented from buckling by the idler roller 32; however, the latter does not normally contact the back surface 14 of the film 10. The belts 33 and 35 are chosen from a fabric which is porous and absorbent; such as plush fabric, commonly made into plush belts. The fabric of the belts 33 and 35 is chosen so that it will be absorptive and capable of removing the coating 14 at the point of contact.

The belts serve several useful purposes viz: they moisten and wipe away the back coating, carrying it into the tray of solvent, the coating particles so carried are deposited. At the same time, the belts are moistened with the solvent and return in their cycle to again moisten and wipe away the back coating from the narrow guided area along the edge of the film to allow guiding and control and provide space for removal of excess solvent from the belts. The lower ends of the endless belts are kept taut and within their recesses in rollers 30 and 34 by means of weighted flanged rollers 38 and 40 mounted on a weighted shaft 36. The purpose of weighting rollers 38 and 40 in shaft 36 is to provide the requisite tension in the belts 33 and 35, although this could also be done by springs, separate weights, or the like.

Figure 3:
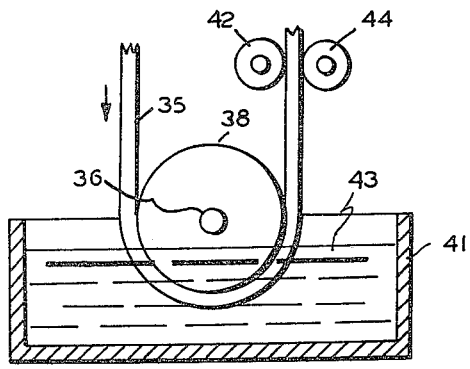
FIG. 3 is a segmental side elevational view of a portion of the apparatus of FIG. 2, showing the passage of the belt through the dampening means.

As shown in FIG. 3, a pair of squeegee or wringer rollers 42 and 44 are provided as the belt moves upwardly. A tank 41, contains a solvent solution 43, in which the rollers 38 and 40 are immersed, of the type adapted to remove the back coating from the film. It is important that the solution used be a solvent for the resin or binder used in the back coating or CBC.

The operation of the apparatus shown in FIGURES 1 to 3 will now be described. The film web 10 having the back coating 14 to be removed is accurately guided by guide rollers 18 and 20 which hold the film in its proper place and insure accurate guiding over the moving belts 33 and 35. The belts 33 and 35 are driven in a direction opposite to the movement of the film 10 by means of rollers 30 and 34. The belts 33 and 35 contact the back surface coating 14 of the film 10 near the edges thereof in a precisely predetermined position. The belts having passed through the solution 43 in tank 41, are dampened and carry a sufficient amount of the solvent to soften, dissolve, and neatly remove the back coating.

Thus, the coating 14 will be removed in a longitudinal stripe at the point where the belts 33 and 35 contact the coating 14 on film 10. The belts then pass back into the solution 43 and are washed therein to remove the sludge of dissolved coating. The wet, solution-laden belt then passes through wringer rollers 42 and 44, where excess solvent is squeezed from the belt to insure a moist, but not soaking wet, condition prior to again coming into contact with the film.

It is also contemplated, to assist in belt cleaning, that a jet of the solution can be directed against the belt under pressure and it also would be within the scope of the invention to provide a moving brush to clean the belt. For long and continuous use, it would be desirable to provide purifying equipment to insure clean solution 43 at all times for the belts. This could be a small distillation type of purifier similar in principle to that used in drycleaning establishments.

Figure 4:
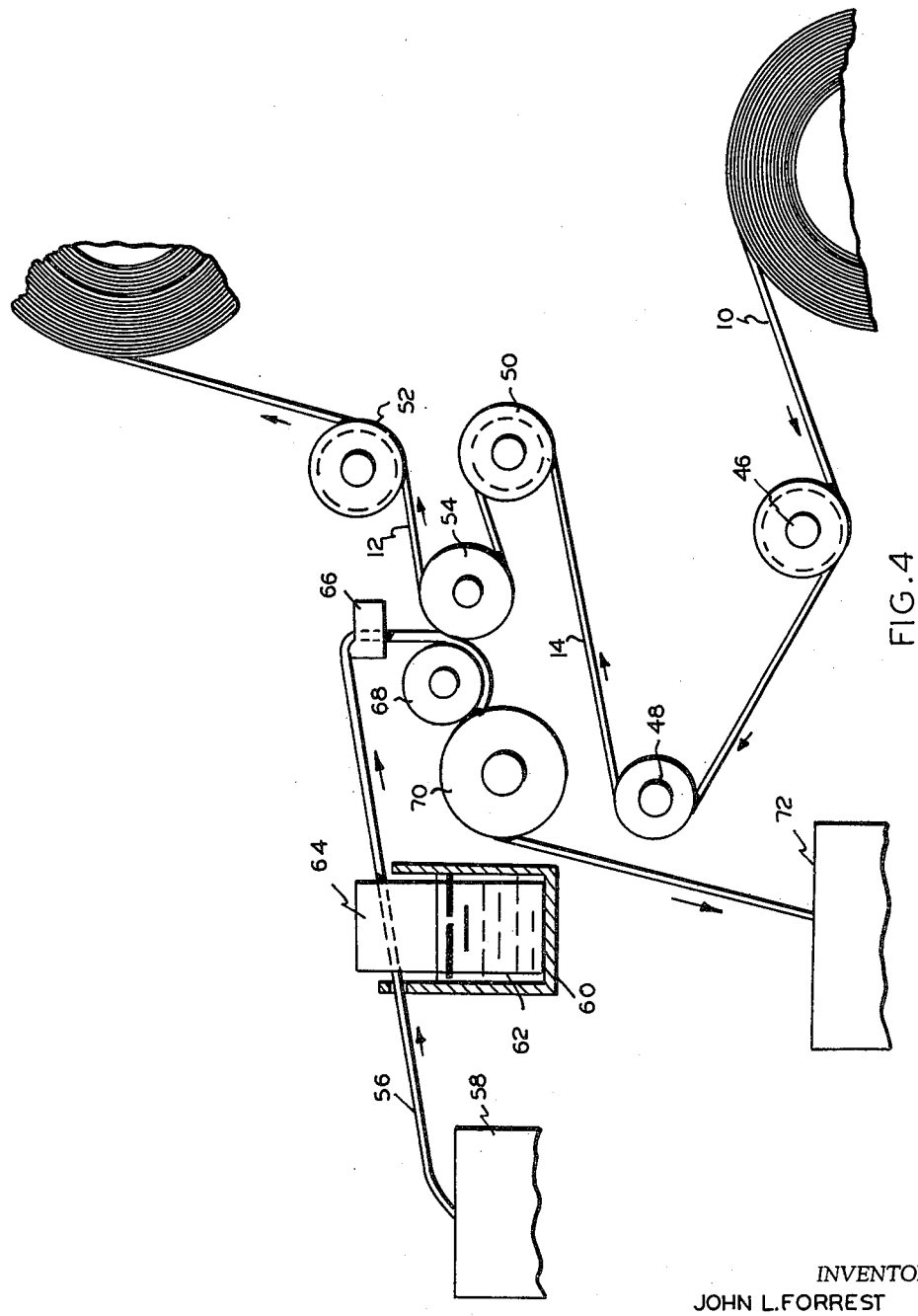
FIG. 4 is a schematic side elevational view of a modified form of the apparatus of this invention.

A modification of the invention is shown in FIGS. 4 and 5. The same general principles of dampening a moving strand with a solvent and passing the strand in guided contact with a film web moving in an opposite direction are utilized. The film 10 is guided around rollers 46, 48 and 50 to a back up roller 54 and then around roller 52 to suitable take up means. The film is of the same construction as is conventionally used and includes a base with a sensitized coating 12 on one surface thereof and a CBC coating 14 on the opposite surface. A longitudinal strip along the edge of the back coating must be removed to provide a surface good for the coating of a magnetizable stripe.

Instead of a belt, a string 56 is utilized supported from a container 58 and passes through a tank 60 containing a suitable solvent solution 62 for removing the back coating 14 of the film 10. The string 56 does not directly contact the solution, but contacts a wick 64, which is saturated with the solution. The moving, dampened string 56 passes through a guide 66 and around a grooved back up roller 68. The back up roller 68 is so related to roller 54 that the string will contact a predetermined area or strip on the edge of the back coating 14 of the film 10. As shown, the back up roller 68 is normally not in direct contact with the film, the string 56 separating them. The string 56 may be driven by a pinch roller 70 in contact with the back up roller 68 and later fed to a suitable string take up 72.

As shown in FIG. 5, there are a pair of parallel-moving strings 56 and 57 and a pair of grooves 76 and 78 in the back up roller 68. Furthermore the entire apparatus would usually be mounted on a suitable support 74. The tank 60 containing solution 62 and wick 64 may be totally enclosed as shown in FIG. 5.

The operation of the FIGS. 4 and 5 embodiment is similar to that described in connection with the operation of the embodiment of FIG. 1. The moving film 10 travels in the direction opposite to the strings 56 and 57 which have previously been dampened with the solvent. The paths of travel are not only in opposite directions, but are guided so that the strings contact only the edges of the film at a predetermined area. With the strings and film in contact with one another, as described, their respective speeds are adjusted until a clean path is wiped through the back coating to provide a strip of bare base with the coating removed between the sprocket perforations and the edge of the film.

The grooves 76 and 78 in roller 68 have a depth of about one-half the thickness of the strings 56 and 57. The roller 68 could also be a stationary guide block and there could be as many grooves as necessary to accept as many strings as necessary to provide the desired number of tracks through the back coating 14.

The use of the string is advantageous in that the diameter thereof determines the width of the strip of CBC coating to be removed from the film surface. By the selection of strings of different diameter, an accurate strip width can be maintained in the removing operation. A further advantage is that the strings may be positioned to wipe any portion of the film surface, not necessarily the edge portion only as would be the case with the moving-belt type described in FIGS. 1, 2 and 3.

What is claimed is:

1. The method of removing a narrow strip of coating from a marginal portion of a web of photographic film which comprises:
    (a) carefully guiding the coated film web through a longitudinal path while firmly supporting said web,
    (b) feeding a long narrow string of width corresponding to the strip to be removed from a supply source past a dampening station and into frictional contact with the marginal portion of the web,
    (c) dampening the string at said dampening station with a solvent for said coating,
    (d) driving the string so as to cause relative motion between the web and the string so as to frictionally remove the coating from said marginal portion.

2. Method according to claim 1 wherein two similar parallel strings are employed to remove a strip of coating from both longitudinal margins of the web.

3. Method according to claim 1 wherein the strings are driven in a direction opposite to that of the web.

4. Apparatus for removing a narrow strip of coating from the marginal edge of a coated web of photographic film which comprises, in combination,
    (a) means for accurately guiding the web laterally and for advancing the web longitudinally,
    (b) a supply for a long narrow flexible string element which is absorptive to a solvent for said coating,
    (c) means for advancing said string from said supply past a dampening station and into frictional contact with a coated surface of said web in a manner to cause relative movement between the string and the web, and
    (d) means at said dampening station for applying a limited amount of solvent for the coating to said string, whereby the dampened string will remove said coating by reason of its frictional engagement of and relative movement with respect to said web.

5. Apparatus according to claim 4 in which a pair of parallel string elements are employed to simultaneously remove a strip of coating from both margins of the web.

References Cited by the Examiner

UNITED STATES PATENTS

| | | | |
|---|---|---|---|
| 506,184 | 10/93 | McDonald | 118—225 X |
| 783,569 | 2/05 | Edlich | 134—15 X |
| 1,206,924 | 12/16 | Scherf | 15—100 X |
| 1,487,375 | 3/24 | Fuchs | 15—100 |
| 1,540,417 | 6/25 | Owens | 118—72 |
| 1,669,394 | 5/28 | Ellis et al. | 134—9 |
| 1,926,363 | 9/33 | Bergstein | 118—75 X |
| 2,142,538 | 1/39 | Tondreau | 15—100 |
| 2,305,011 | 12/42 | Kienninger | 15—100 |
| 2,628,924 | 2/53 | Johnston et al. | 134—15 |
| 2,633,428 | 3/53 | Klug | 134—15 X |
| 2,927,553 | 3/60 | Del Valle | 117—44 X |
| 3,050,758 | 8/62 | Wilkins | 15—100 |

DONALL H. SYLVESTER, *Primary Examiner.*

MORRIS O. WOLK, *Examiner.*